Patented Oct. 17, 1933

1,930,754

UNITED STATES PATENT OFFICE 1,930,754

CHLORINATION OF ARYLAMINES

Emeric Havas and Henry R. Lee, South Milwaukee, Wis., assignors to E. I. du Pont de Nemours & Company, Wilmington, Del., a corporation of Delaware No Drawing. Application January 25, 1932
Serial No. 588,820

8 Claims. (Cl. 260—130.5)

This application is a continuation in part of our co-pending application Ser. No. 531,644, filed April 20, 1931. In that application we have disclosed a novel, systematic and efficient process for chlorinating o-toluidine, whereby to obtain the chlorinated product in good yield, substantially free of isomers and at a considerable saving in the cost of production as compared with hitherto known processes. The dominant characteristic of said process consisted of converting o-toluidine into a relatively inexpensive acidyl derivative, more particularly the formyl derivative, and then effecting dehydration, chlorination, and hydrolysis of the chlorinated formylamino compound in the same medium, without isolation of any intermediate products. The entire process thus becomes so systematized that each step or operation interlinks with the next step, and cooperates therewith to effect a maximum saving of both materials and manipulation. Moreover, the final product is very conveniently separated from isomeric chlorination derivatives formed therewith.

We have now found that our novel systematic process is of much wider applicability, and may be used with great success on various other aromatic amines having a free para-position. Our process is particularly useful in conjunction with arylamines of the benzene series, and has proven successful even on such arylamines, as for instance, cresidine, which has heretofore apparently never been chlorinated. As for those arylamines which have been directly chlorinated, the hitherto practiced methods of preparing and isolating the p-chloro compound may be illustrated by the following typical process applied specifically to o-toluidine.

1-methyl-2-amino-5-chloro-benzene (p-chloro-o-toluidine) has been prepared in the art by a process comprising substantially the following steps:

(a) Conversion of o-toluidine to the corresponding acetyl derivative by treatment with acetic anhydride or glacial acetic acid.

(b) Chlorination of the acetyl compound thus formed in acetic acid by means of chlorine or sodium chlorate and hydrochloric acid (Lellman & Klotz, Annalen, vol. 231, pages 317, 318; Reverdin & Crepieux, Berichte, vol. 33, page 2499).

(c) Separation of the chlorinated aceto-toluidide from the acetic acid, generally by diluting the reaction mass with water and filtering (Reverdin & Crepieux, ibid.).

(d) Purification of the chlorinated compound; more particularly, separation of the 5-chloro compound from its isomers and other chlorine derivatives; generally by recrystallization from alcohol.

(e) Hydrolysis of the chlorinated-aceto-toluidide with caustic soda to give the free base, or with hydrochloric acid to give the hydrochloride thereof. (Lellman & Klotz and Reverdin & Crepieux, above).

(f) Final purification by steam distillation.

In British Patent No. 294,462, a modification of the above processes has been proposed, whereby instead of converting the ortho-toluidine in step (a) into its acetyl derivative, it is converted into the corresponding o-toluene-sulfonyl derivative, the remaining steps being substantially as above outlined. It is claimed that this modification produces a more homogeneous product, avoiding the formation of isomers or higher halogen derivatives. The yield, however, has not been stated, and it is not clear if no isomers have been formed at all in the process, or if a more efficient separation of the 5-chloro-2-acidylamino-1-toluene from its isomers is obtained.

In all the above processes large quantities of glacial acetic acid are necessary. A large portion of this is practically completely wasted in the dilution step, since recovery of acetic acid from a dilute solution is a costly operation, and will at best return only a small fraction of the initial cost of the acid.

In those processes also large quantities of hydrochloric acid are required for hydrolysis, because of the diluting action effected by the acetic acid and water physically held in the filter cake. Although 1 mole of HCl is formed in the chlorination step for each mole of toluidine chlorinated, this is entirely lost in the filtration step and therefore is not available for the hydrolysis step. Furthermore, the step of separating the chlorinated acidylamino compound from the acetic acid itself also constitutes a waste since it consumes labor, time, and plant equipment. On the other hand, this step cannot be dispensed with, because otherwise excessively large and impractical quantities of hydrochloric acid would be required to effect hydrolysis, in view of the large quantity of acetic acid present in the mass and in view of its diluting action upon the HCl.

Another big disadvantage of all these processes is that the acidylating agents used, glacial acetic acid, acetic anhydride, ortho-toluene-sulfochloride and the like, are expensive, and are practically completely wasted.

It is accordingly an object of this invention to provide an efficient and systematic process for chlorinating arylamines having a free para-position.

It is a further object of this invention to provide a process for chlorinating arylamines whereby the corresponding parachloro-arylamine body is prepared in good yield and may be economically and effectively separated from any isomeric chloro derivatives formed therewith.

It is a further object of this invention to provide a process for chlorinating arylamines wherein each step or operation cooperates with the next step to produce a maximum economy of raw materials and manipulation and to reduce the cost of the final product.

It is a further object of this invention to provide a process for chlorinating arylamines which is of general applicability, and which produces successful results with various arylamino bodies which were not known heretofore to be susceptible to chlorination.

Other and further important objects of this invention will appear as the description proceeds.

According to our invention, the given arylamine body is first converted into its formyl derivative by reacting upon the same with a concentrated solution of formic acid. The mass is then suspended in an organic solvent which is a solvent for the formylamino body, immiscible with water, and inert toward chlorination in the absence of a catalyst. As typical examples of such organic solvent, benzene, toluene, and chlorobenzene may be mentioned. The mass is then heated to evaporate off the water formed in the formylation step, cooled, and a chlorinating agent, such as chlorine gas or sulfuryl chloride is introduced, until the calculated amount of chlorine has been absorbed. At this stage the mass contains the p-chloro derivative of the particular aryl-formylamide started with, in addition to some isomeric chlorine derivatives, all dissolved in the organic medium. This mass is now mixed with water and hydrochoric acid and is heated, whereby hydrolysis of the formyl group, formation of the hydrochloride of the amine, and simultaneous separation of the mass into three phases takes place. It is a characteristic feature of our invention and a most highly convenient circumstance that in most cases the hydrochloride of the p-chloro-arylamino body is less soluble in water than the hydrochlorides of the isomeric chloro derivatives. Consequently, the hydrochloride of the p-chloro-arylamine body separates from the mixture as a solid phase, substantially free of isomers. The isomeric chloro derivatives, in the form of their hydrochlorides are transferred from the organic medium, which separates as an oily phase, into the aqueous phase and remain dissolved therein together with any residual hydrochloric acid and the formic acid formed by hydrolysis. The separation of the three phases is now a very simple matter, as will be readily understood to anyone skilled in the art. The solid phase is isolated by filtration, and needs no further treatment except washing, and, where the free base is desired, treatment with caustic alkali. Depending on whether the last step is used or not, the product is substantially pure p-chloro-arylamine or the hydrochloride thereof. The organic layer may be separated by settling and decantation and steam distilled to recover the organic solvent in substantially pure form. The aqueous phase may be discarded or treated in any suitable manner to recover its constituents.

The cooperative and systematic interlinkage of the various steps in our process will now become more readily apparent from the following discussion.

The first characteristic and profitable feature of our invention is the selection of formic acid as acidylating agent. The immediate advantage of this selection is that formic acid costs considerably less, mole for mole, than glacial acetic acid, acetic anhydride, or o-toluene-sulfo-chloride.

Another important advantage made possible by the use of formic acid is the fact that the formyl compounds of most arylamines are highly soluble in water-insoluble organic solvents such as toluene or benzene. This permits performing the entire process, namely, the chlorination and the hydrolysis, in an inert organic medium, such as, for example, toluene, which can be efficiently recovered at the end of the reaction. Moreover, the use of toluene as a solvent in the chlorination step enables one to eliminate the heretofore necessary step of separating the chlorinated compound from the solvent before hydrolysis. Thus the materials, labor and time heretofore consumed in this step are saved. Furthermore, the use of toluene saves the hydrochloric acid formed in the chlorination step. Also, the formyl group is more readily hydrolyzed than the acetyl group. Consequently, the quantity of hydrochloric acid that must be added in the hydrolysis step is reduced to a mere fraction of the quantity required in heretofore known processes.

Finally, the use of an anhydrous organic medium reduces the volumes of liquid to be handled to a minimum, which in itself is a great advantage, but possesses the further advantage that only a relatively small quantity of water is required in the hydrolysis step. Therefore, very little of the hydrolyzed p-chloro derivative is soluble in the aqueous layer, and this compound readily separates from isomers without resort to any special intermediary separation steps, such as isolation of all the chloro bodies in solid form, and fractionally recrystallizing the same from alcohol.

Other material advantages from our novel systematized process will appear from the detailed description below.

Without limiting our invention to any particular procedure, the following examples, in which parts by weight are given, will serve to illustrate our systematic method in its preferred form.

*Example 1*

321 parts of o-toluidine, and 180 parts of 90% formic acid are heated together at about 100 to 103° C. for about 3 hours. The mass is then cooled to about 70° C., and 750 parts of toluene are added. The mass is now heated to distill off the excess of formic acid as well as any water present, and then cooled to about 60° C. Additional toluene is now introduced into the mass to bring the total quantity of toluene to about 1400 parts. The toluene diluted mass is cooled to about 20° C., and chlorine gas is passed through the mixture until about 234 parts have been consumed. 175 parts of water are now added, and 260 parts of an aqueous hydrochloric acid solution (20° Bé.) are now introduced. The mass is heated at about 60° C. for about 2 hours, cooled to 20° C. and filtered. The filter cake is dried by suction, and constitutes the hydrochloride of 5-chloro-2-amino-1-toluene in high yield, and of sufficient purity to be applicable directly for technical purposes.

The filtrate consists of two phases: (1) An aqueous phase containing dissolved therein the excess hydrochloric acid and the hydrochloride of any isomeric chloro-toluidines formed and (2) an oily phase from which the toluene may be recovered in pure form by steam distillation.

*Example 2*

242 parts of p-xylidine and 120 parts of 90% formic acid are heated together at about 100–103° C. for about 3 hours. The mass is then cooled to about 70° C. and 500 parts of toluene are added. The mass is now heated to distill off the excess of formic acid as well as any water that is present and then cooled to about 60° C. Additional toluene is now introduced into the mass to bring the total quantity of toluene to about 1800 parts. The toluene-diluted mass is cooled to about 20° C. and chlorine gas is passed into the mixture at 20° C. until 142 parts have been consumed. 50 parts of water are now added and 170 parts of an aqueous hydrochloric acid solution (20° Bé.) are introduced. The mass is heated at about 60–65° C. for about 2 hours, cooled to 20° C. and filtered. The filter cake constitutes the hydrochloride of 5-chloro-2-amino-1,4-xylene in high yield and of sufficient purity to be applicable directly for technical purposes.

The filtrate consists of two phases. (1) An aqueous phase containing dissolved therein the excess hydrochloric acid and the hydrochloride of any isomeric chloro-xylidines formed, and (2) an oily phase from which the toluene may be recovered in pure form by steam distillation.

*Example 3*

274 parts of cresidine (1-methoxy-2-amino-4-toluene) and 120 parts of 90% formic acid are heated together at about 100–103° C. of about 3 hours. The mass is then cooled to about 70° C. and 500 parts of toluene are added. The mass is now heated to distill off the excess of formic acid as well as any water that is present and then cooled to about 60° C. Additional toluene is now introduced into the mass to bring the total quantity of toluene to about 1800 parts. The toluene-diluted mass is cooled to about 20° C. and chlorine gas is passed into the mixture at 20° C. until about 142 parts have been consumed. 50 parts of water are now added and 170 parts of an aqueous hydrochloric acid solution (20° Bé.) are introduced. The mass is heated at about 60–65° C. for about 2 hours, cooled to 20° C. and filtered. The filter cake constitutes the hydrochloride of 5-chloro-2-amino-1-methoxy-4-toluene in high yield and of sufficient purity to be applicable directly for technical purposes.

The filtrate consists of two phases: (1) An aqueous phase containing dissolved therein the excess hydrochloric acid and the hydrochloride of any isomeric chloro-cresidines formed, and (2) an oily phase from which the toluene may be recovered in pure form by steam distillation.

It will thus be seen that our novel, systematic process is exceedingly simple in operation, reduces the handling of materials to a minimum, saves hydrochloric acid, replaces the costly acidylating agent by the comparatively cheap formic acid, uses an inexpensive solvent for the reaction, and enables the recovery of the same without waste and at very little cost. Due to the great reduction in liquid volumes handled and the substantial absence of dilute solvents, the separation of p-chloro-arylamine body from its isomers is more complete and the product is obtained in a comparatively pure state.

It will be understood that many variations and modifications are possible in the specific procedure disclosed, without departing from the spirit of this invention.

Thus, instead of chlorine gas, other chlorinating agents which are adapted for use in anhydrous media may be used, for instance, sulfuryl chloride. Instead of toluene any other organic solvent may be used, provided it is a good solvent for the particular aryl-formamide, immiscible with water, and not readily chlorinated at low temperatures in the absence of a catalyst. Benzenoid solvents such as, for instance benzene and chlorbenzene are specific examples of solvents that may be used in place of toluene.

Similarly, although we have preferred to use hydrochloric acid in the hydrolysis step, it will be understood that other inorganic acids may be used, for instance sulfuric acid. In this case, of course, the product precipitates in the form of sulfate instead of hydrochloride.

It will be further understood, that although we have illustrated our invention specifically with respect to benzenoid arylamines, such as o-toluidine, p-xylidine and cresidine, our process is applicable with equal advantage to the chlorination of other arylamines having a free p-position.

We are aware that formyl-amido-aryl compounds have been chlorinated heretofore, but to the best of our knowledge no one has used the formal derivative of arylamines in a systematic combination process as herein set forth whereby in each step cooperates with the next step to produce a highly efficient, economical and unified result.

In the claims below it should be understood that where we speak of "a p-chloro-arylamine body" we mean to include such body both in basic form or in the form of a salt thereof.

We claim:

1. A process for preparing a p-chloro-arylamine body of the benzene series, which comprises reacting with a chlorinating agent upon a solution of a formyl-amino-aryl body of the benzene series in an anhydrous benzenoid solvent which is substantially inert toward chlorine, adding an aqueous non-oxidizing inorganic acid solution to effect hydrolysis of the formyl group, and recovering the precipitated salt of the p-chloro-arylamine.

2. A process for preparing a p-chloro-arylamine body of the benzene series, which comprises reacting with chlorine gas upon a solution of a formyl-amino-aryl body of the benzene series, having a free position para to the amino group, in toluene, adding an aqueous non-oxidizing inorganic acid solution, warming to effect hydrolysis of the formyl group, and recovering the precipitated salt of the p-chloro-arylamine.

3. A process for preparing a p-chloro-arylamine body of the benzene series, which comprises reacting with a chlorinating agent upon a solution of a formyl-amino-aryl body of the benzene series in an anhydrous benzenoid solvent which is substantially inert toward chlorine, adding an aqueous hydrochloric acid solution to effect hydrolysis of the formyl group, and recovering the precipitated hydrochloride of the p-chloro-arylamine.

4. A process for preparing a p-chloro-arylamine body of the benzene series, which comprises reacting with chlorine gas upon a solution of a formyl-amino-aryl body of the benzene series, having a free position para to the amino group, in toluene, adding an aqueous hydrochloric acid solution, warming to effect hydrolysis of the formyl group, and recovering the precipitated hydrochloride of the p-chloro-arylamine.

5. A process for preparing a p-chloro-arylamine body of the benzene series, which comprises reacting with a chlorinating agent upon a solution of a formyl-amino-aryl body of the benzene series having a free position para to the amino group, in an anhydrous organic solvent which is substantially immiscible with water and inert toward chlorine at room temperature and in the absence of catalysts; adding an aqueous non-oxidizing inorganic acid solution to effect hydrolysis of the formyl group, and recovering the precipitated salt of the p-chloro-arylamine.

6. The process of preparing a p-chloro-arylamino body of the benzene series which comprises reacting upon an arylamino body of the benzene series, having a free position para to the amino group, with formic acid to produce the corresponding formylamino-aryl body, dissolving the latter in toluene, heating the mixture to eliminate excess formic acid and water, passing chlorine gas into the toluene solution of the formyl-amino-aryl body, adding an aqueous non-oxidizing inorganic acid solution, warming the mass to effect hydrolysis of the formyl group, and filtering to isolate the salt of the p-chloro-arylamine.

7. A process for preparing a p-chloro-arylamine body of the benzene series, which comprises reacting with a chlorinating agent upon a solution of a formyl-amino-aryl body of the benzene series having a free position para to the amino group, in an anhydrous organic solvent which is substantially immiscible with water and inert toward chlorine at room temperature and in the absence of catalysts, adding an aqueous hydrochloric acid solution to effect hydrolysis of the formyl group, and recovering the precipitated hydrochloride of the p-chloro-arylamine.

8. The process of preparing a p-chloro-arylamino body of the benzene series which comprises reacting upon an arylamino body of the benzene series having a free position para to the amino group, with formic acid to produce the corresponding formylamino-aryl body, dissolving the latter in toluene, heating the mixture to eliminate excess formic acid and water, passing chlorine gas into the toluene solution of the formyl-amino-aryl body, adding an aqueous hydrochloric acid solution, warming the mass to effect hydrolysis of the formyl group, and filtering to isolate the hydrochloride of the p-chloro-arylamine.

EMERIC HAVAS.
HENRY R. LEE.